(12) United States Patent
Johnson

(10) Patent No.: US 7,646,292 B2
(45) Date of Patent: Jan. 12, 2010

(54) METHODS AND SYSTEMS FOR VERIFYING THE POSITION AND STATUS OF HIERARCHICALLY ARRANGED OBJECTS

(75) Inventor: Richard C. Johnson, Poquott, NY (US)

(73) Assignee: Oracle International Corporation, Redwood Shores, CA (US)

( * ) Notice: Subject to any disclaimer, the term of this patent is extended or adjusted under 35 U.S.C. 154(b) by 461 days.

(21) Appl. No.: 11/442,033

(22) Filed: May 25, 2006

(65) Prior Publication Data

US 2006/0220829 A1   Oct. 5, 2006

Related U.S. Application Data

(63) Continuation of application No. 10/868,294, filed on Jun. 14, 2004, now Pat. No. 7,088,229.

(51) Int. Cl.
    *G08B 26/00* (2006.01)
(52) U.S. Cl. .............. 340/505; 340/506; 340/539.1; 340/539.11; 340/539.13; 340/539.32; 340/572.1; 340/10.1; 340/825.36; 340/825.49; 340/5.2
(58) Field of Classification Search .......... 340/505, 340/506, 539.1, 539.11, 539.13, 539.32, 340/572.1, 10.1, 825.36, 825.49, 5.2, 687, 340/691.1
    See application file for complete search history.

(56) References Cited

U.S. PATENT DOCUMENTS

| 5,883,884 | A  | 3/1999  | Atkinson       |
|-----------|----|---------|----------------|
| 5,892,441 | A  | 4/1999  | Woolley et al. |
| 6,611,750 | B2 | 8/2003  | MacPhail et al.|
| 6,641,052 | B2 | 11/2003 | Baillod et al. |
| 6,662,078 | B1 | 12/2003 | Hardgrave et al.|
| 6,667,092 | B1 | 12/2003 | Brollier et al.|
| 6,681,990 | B2 | 1/2004  | Vogler et al.  |
| 6,693,539 | B2 | 2/2004  | Bowers et al.  |

(Continued)

FOREIGN PATENT DOCUMENTS

DE           43 34 797 A1      3/1995

(Continued)

OTHER PUBLICATIONS

United States General Accounting Office Report to Congressional Requesters, "Container Security, Expansion of Key Customs Programs Will Require Greater Attention to Critical Success Factors" GAO-03-770:1-51, Jul. 2003.

(Continued)

*Primary Examiner*—Daryl Pope
(74) *Attorney, Agent, or Firm*—Townsend and Townsend and Crew LLP

(57) ABSTRACT

A device for tracking an item or a box may include a conductive mesh configured to at least partially cover the item or the box, and a wireless tag coupled to the conductive mesh. The wireless tag may be configured to report a breaching of the conductive mesh or an opening of the box by issuing a first predetermined RF signal. The wireless tag may include a GPS device and the first predetermined signal may include GPS-derived geographical information.

32 Claims, 5 Drawing Sheets

U.S. PATENT DOCUMENTS

| | | | |
|---|---|---|---|
| 6,700,533 | B1 | 3/2004 | Werb et al. |
| 6,714,121 | B1 | 3/2004 | Moore |
| 6,745,027 | B2 | 6/2004 | Twitchell, Jr. |
| 7,009,518 | B2 | 3/2006 | Liao et al. |
| 7,015,793 | B2 | 3/2006 | Gabig et al. |
| 7,019,642 | B2 | 3/2006 | Nelson et al. |
| 7,023,341 | B2 | 4/2006 | Stilp |
| 7,026,935 | B2 | 4/2006 | Diorio et al. |
| 2002/0188259 | A1 | 12/2002 | Hickle et al. |
| 2003/0011466 | A1* | 1/2003 | Samuel et al. ............. 340/5.73 |
| 2003/0030569 | A1 | 2/2003 | Ulrich et al. |
| 2003/0052782 | A1 | 3/2003 | Maloney |
| 2003/0075608 | A1 | 4/2003 | Atherton |
| 2004/0021572 | A1 | 2/2004 | Schoen et al. |

FOREIGN PATENT DOCUMENTS

| | | |
|---|---|---|
| WO | WO 00/11590 A | 3/2000 |
| WO | WO 00/52498 A | 9/2000 |
| WO | WO 03/098851 A | 11/2003 |

OTHER PUBLICATIONS

"Fact Sheet: U.S. Customs Service's Container Security Initiative" Office of International Information Programs, U.S. Department of State, Web site: http://usinfo.state.gov, Feb. 22, 2002.

Department of The Parliamentary Library, Information and Research Services, "Ripples from 9/11: the US Container Security Initiative and its Implications for Australia" No. 27 2002-03:1-12, May 13, 2003.

Young, "Container Security Improvements needed to prevent terrorist attacks through U.S. ports, according to maritime officials" Mar. 13, 2002.

Feder, "Wal-Mart hits snags in push to use radio tags to track goods" New York Times, Technology, printed Mar. 29, 2004.

Association for Automatic Identification and Mobility, "What is radio frequency identification?" printed Mar. 5, 2004.

Savi Technology, "Savi Reuseable Transport Containers" printed Nov. 26, 2003.

Oracle Press Release, "Oracle Unveils RFID Capabilities for Warehouse Management-New RFID Platform Facilitates Compliance with Wal-Mart and Department of Defense RFID Mandates" Jan. 27, 2004.

Jeffrey D. Lindsay and Walter Reade, "Cascading RFID Tags", Dec. 23, 2003, IP.com, Article 21112D, https://priorart.ip.com/viewPub.jsp?pubID=IPCOM00021112D.

RFID Journal, "Savi Technology is combining its long-range battery-powered RFID tags with passive tags from Matrics to create a 'nested visibility'", Jul. 24, 2003, http://216.121.131.129/article/articleprint/512/-1/1/Passive, Active RFID Tags Linked.

Sharon McDonnell, "Lost Luggage Is Rare, but the Trauma Can Be Acute", The New York Times, Jun. 8, 2004.

J. Woods, Research Note E-21-7650, Jan. 8, 2004, DOD will nurture transformative RFID to help warfighters, pp. 1-4.

Written Opinion mailed May 31, 2005, in corresponding International Application No. PCT/US2005/003723, filed Feb. 3, 2005 (7pgs).

International Search Report mailed May 31, 2005, in corresponding International Application No. PCT/US2005/003723, filed Feb. 3, 2005 (7pgs).

Examiner's Report dated Mar. 11, 2008, in related Australian Application No. 2005257747.

Communication pursuant to Article 94(3) EPC in related EP application 05712966.0, dated Sep. 4, 2008.

Examiner's Report dated Jun. 12, 2007, in related European Application No. 05712966.0.

* cited by examiner

METHODS AND SYSTEMS FOR VERIFYING THE POSITION AND STATUS OF HIERARCHICALLY ARRANGED OBJECTS

This application is a continuation of application Ser. No. 10/868,294, filed Jun. 11, 2004, which application is hereby incorporated herein in its entirety and from which application priority is hereby claimed under 35 U.S.C. §120.

BACKGROUND OF THE INVENTION

1. Field of the Invention

The present inventions relate generally to methods and systems for tracking the presence, position and status of individual items, containers and the contents thereof, including locks and seals for such items and containers.

2. Description of the Prior Art and Related Information

When items are shipped over distances in sealed containers, boxes and other packaging (as most manufactured items are), a wide variety of problems can occur.

The five scenarios outlined below are illustrative of such problems.

1. The vendor ships the wrong item or no item;
2. The shipping company's employees or others having access during shipment remove some or all of the contents and reseal the package or container;
3. The return authorization and/or address to which returns must be sent is incorrectly understood or executed by the recipient;
4. The recipient claims (fraudulently) that the package delivered did not contain the item ordered;
5. The recipient (fraudulently) returns the package as though the ordered item were being returned, but the recipient keeps the ordered item and substitutes another similar but inauthentic item.

Because the package or container conceals its contents, it is often difficult to determine just who has or should have both custody and responsibility when goods do go missing. Theft and fraud are difficult to detect, and a contention that there was nothing of value in a box is very difficult to defeat. Previous (and undesirable) solutions depended upon non-technical processes including bureaucratic hurdles, negotiation, investigation, intimidation and simple loss write-offs to deal with errors, theft and fraud in both ecommerce and mail order fulfillment as well as large and high value transactions involved in, for example, shipping containers between continents on ships.

Credit card fees charged to merchants include charges specifically intended to defray costs of lost merchandise where customers dispute charges. Since often no one can be found to take responsibility, the expense of such lost merchandise is written off as a cost of using credit cards. Many credit card companies specify an appeals process for a denied charge that imposes difficult, bureaucratic, and lengthy procedures on consumers. This is intended to deter denial of charges, whether justified or not.

Improved methods and systems for tracking packages and containers would help to mitigate these disadvantages and inefficiencies. Specifically, what are needed are methods and systems for tracking both the containers and the contents thereof, from the initial vendor, through the shipping process, until receipt and acceptance thereof by the ultimate buyer. Also needed are methods, devices and systems to seal and lock containers to prevent theft and fraud during transit.

SUMMARY OF THE INVENTION

According to an embodiment thereof, the present invention is a device for tracking an item or a box. The device may include a conductive mesh configured to at least partially cover the item or the box, and a wireless tag coupled to the conductive mesh, the wireless tag being configured to report a breaching of the conductive mesh or an opening of the box by issuing a first predetermined RF signal.

The wireless tag may include an RFID device. The wireless tag may be configured to issue a second predetermined RF signal, the second predetermined signal indicating that the conductive mesh and wireless tag are intact. The conductive mesh and the wireless tag are configured such that removal of the wireless tag from the conductive mesh disables the wireless tag. The wireless tag may be passive and configured to issue the first or second predetermined RF signals only when polled. Alternatively, the wireless tag may be configured to draw its power from a battery. The item may be a box and the conductive mesh may be configured to at least partially encapsulate the box. The item may be a document, and may be currency, for example. The conductive mesh may be embedded within the document.

The wireless tag may include a GPS device and may be configured to include GPS-derived geographical information in the first predetermined RF signal. The first and second predetermined RF signals may include a time stamp. The wireless tag may be configured to be powered from a power source within the item. For example, the conductive mesh may be a single conductive strand and the wireless tag may be configured to report on an electrical property of the single conductive strand. A serial number may be associated with the wireless tag and the first predetermined RF signal may be decodable to retrieve the serial number therefrom.

According to another embodiment thereof, the present invention is a method of tracking an item, comprising the steps of: providing a conductive mesh to which may be coupled a wireless tag, the wireless tag being configured to wirelessly report a state of the conductive mesh by selectively issuing a first or a second predetermined RF signal; covering at least a portion of the item with the conductive mesh, and periodically receiving the first or second predetermined RF signal from the wireless tag coupled to the conductive mesh.

The providing step may be carried out with the wireless tag including an RFID device, for example. The providing step may be carried out with the wireless tag being configured to issue the first predetermined RF signal when the conductive mesh and the wireless tag are intact and to issue the second predetermined RF signal when the conductive mesh and/or the wireless tag are not intact. The providing step may be carried out with the conductive mesh and the wireless tag being configured such that removal of the wireless tag from the conductive mesh disables the wireless tag. The method may further include a step of polling the wireless tag and the receiving step may be carried out responsive to the polling step. The providing step may be carried out with the wireless tag being passive and configured to issue the first or second predetermined RF signals only when polled. Alternatively, the providing step may be carried out with the wireless tag being configured to draw its power from a battery. The item may include a box and the covering step may include a step of at least partially encapsulating the box. The covering step may be carried out with the item including a document. The covering step may be carried out with the document being currency (money or a bank card, for example). The method may further include a step of embedding the conductive mesh within the document. The providing step may be carried out with the wireless tag including a GPS device and the first and second predetermined RF signals may include GPS-derived geographical information. The providing step may be carried out with the first and second predetermined RF signals including a time stamp. The providing step may be carried out with the wireless tag being configured to be powered from a power source within the item. The providing step may be carried out with the conductive mesh being a single conductive strand and the wireless tag may be configured to report on an electrical property of the single conductive strand. The providing step may be carried out with a serial number being associated with the wireless tag and the first predetermined RF signal may be decodable to retrieve the serial number therefrom.

According to yet another embodiment thereof, the present invention is a method of remotely determining if an item has been added to or removed from a container. The method may include steps of providing a conductive mesh to which may be coupled a wireless tag, the wireless tag being configured to wirelessly report a state of the conductive mesh by selectively issuing a first or a second predetermined RF signal; sealing the container with the conductive mesh, and periodically receiving the first or second predetermined RF signal from the wireless tag coupled to the conductive mesh, receipt of the first predetermined RF signal indicating that no item has been added to or removed from the container and receipt of the second predetermined RF signal indicating that an item may have been added to and/or removed from the container.

The providing step may be carried out with the wireless tag including a GPS device and the first and second predetermined RF signals may include GPS-derived geographical information. The method may further include steps of comparing the GPS-derived geographical information from consecutively received first and/or second predetermined RF signals with an expected itinerary of the container during shipment, and determining whether and where the container deviated from its expected itinerary.

DETAILED DESCRIPTION

Figure 1:
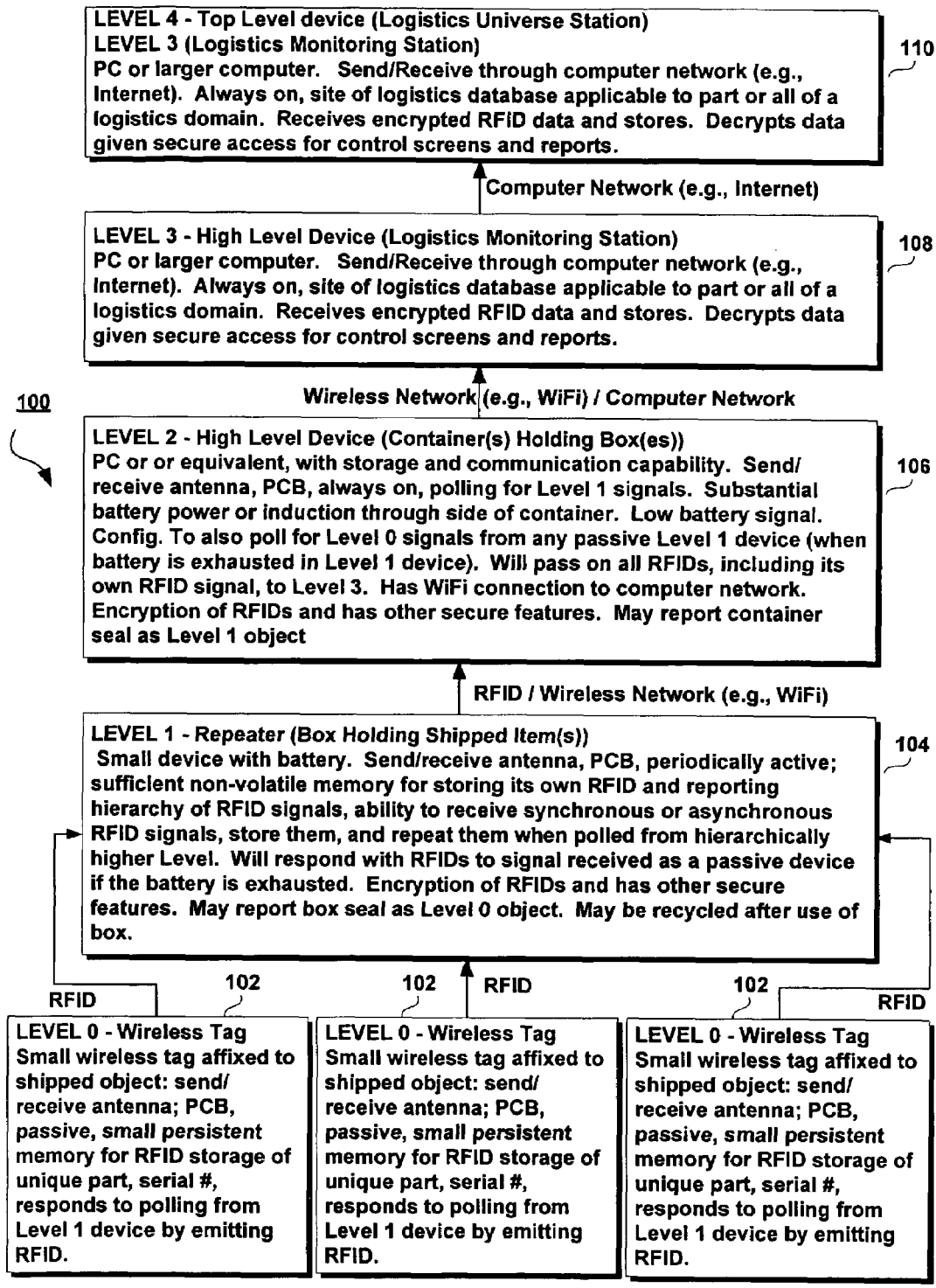
FIG. 1 is a block diagram that illustrates aspects of the tracking system for tracking a plurality of items according to an embodiment of the present invention.

Embodiments of the present invention allow containers or packages (as well as the contents of these containers or packages) to be tracked. This tracking may include the detection of the presence or absence of these containers or packages or may also include such characteristics as the position and/or state thereof. As utilized herein, the terms "container", "box", "package" and like terms are used interchangeably, and are intended to include any enclosure that is configured to contain or enclose one or more objects. For example, a container might be a 20'×8'×8.5' standard container commonly used in ocean freight.

Embodiments of the present invention use Radio Frequency (hereafter, RF) signals to announce the position and status of hierarchically arranged objects either as programmed or as polled from another device. According to one embodiment of the present invention, at the bottom of the hierarchy of objects is a single unit of an object (if the objects in the hierarchy are individually separable, such as watches or rubber tires, for example). Alternatively, the bottom of the hierarchy may be defined by a predetermined measure of an object or material (generally, fungible items such as wheat or oil, for example). The top-level of the hierarchy may be defined as the highest level grouping of such objects. Levels of the hierarchy may include an organization, political or other logical structure and/or a predefined geographical locus, for example.

For example, stereo radios may be individually packed in their own packaging, and such packaging and the contents thereof may belong to Level 0, the bottom of the hierarchy. These packed stereos may be bundled in boxes containing 100 stereos. Such boxes of 100 stereos would then belong to the next highest level in the hierarchy of object, namely Level 1. Two such boxes of one hundred stereos may be packed into a standard container for oceanic shipping. Such a container may belong to the next-highest level in the hierarchy; namely, Level 2. In turn, a shipping vessel may be loaded with a shipment of a dozen such containers, and these dozen containers may be collectively belong to the next highest hierarchy level, Level 3. A hierarchy is thus formed, where each higher level encompasses lower levels in the hierarchy, logically and/or physically. In this illustrative example, Level 3 contains a dozen shipping containers, each Level 2 container contains two boxes designated as Level 1, and each such Level 1 box contains one hundred stereos, which are each designated as Level 0, which designates the lowest object in the hierarchy. Embodiments of the present invention enable both the position and status of items (such as the stereos used in this example) at any of the above-discussed hierarchical levels; that is, from the position and status of the dozen containers loaded on the container ship, down to the position and location of each of the 2,400 stereos of this exemplary shipment. The number of levels of hierarchy may vary according the needs of a specific application, and lower or higher levels may be omitted for economy or other reasons. Additional levels of hierarchy may also be added; the disclosed inventions are intended to include, at the theoretical maximum, any number of levels of hierarchy, although it is understood that only a limited number would ever be economically and practically feasible.

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

FIG. 1 is a block diagram that illustrates certain aspects of the hierarchical nature of an embodiment of the present invention. According to an embodiment of the present invention, each object or individual article packed in a box may be first tagged with an electronic wireless tag (such as those based on RF, for example) containing a unique number. This unique number may, but need not be, associated with the serial number of the tagged object (if such serial number exists). Alternatively, a random string of numbers may be used, or the unique number may be associated with a transaction number representing the transaction between the buyer and seller that led to the shipment of which the tagged article forms part. The tag may be affixed to the article by means of adhesive, for example, or may be secreted within the article itself. The uniquely identified and identifiable wireless tag may form part of a logical family (e.g., a predefined sequence or other grouping) of such tags. The wireless tag is configured to send out a weak RF signal containing the unique number associated therewith. This weak RF signal may be readable within a given distance. Different tags may be configured to transmit a stronger signal than others, and would, therefore, be readable at a greater distance. It is to be expected that those wireless tags that are configured to send out the stronger signals will be relatively more costly than those wireless tags configured to send out comparatively weaker RF signals, even though they may be technically similar in construction. According to an embodiment of the present invention, such wireless tags may be configured to be removable by, e.g., the ultimate buyer. However, it may be specified that the article may not be returnable if the wireless tag previously affixed thereon has been removed. For example, removal of the wireless tag affixed to the article may constitute the buyer's acceptance of the merchandise, and acquiescence of the overall validity of the underlying transaction.

Figure 3:
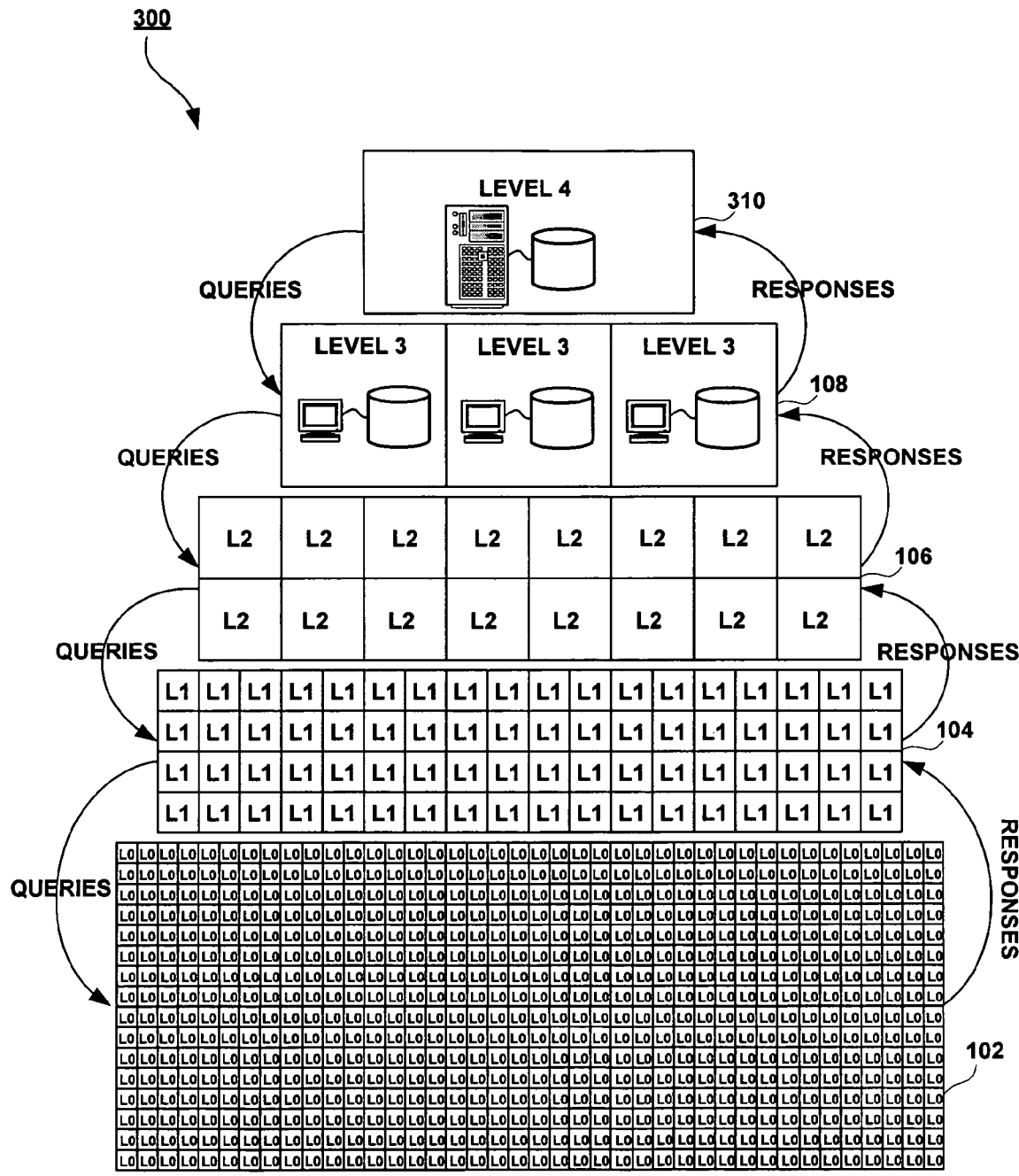
FIG. 3 is a block diagram that illustrates aspects of the hierarchical nature of embodiments of the present invention.

With reference to FIG. 1 and FIG. 3, such wireless tags are referenced at numeral 102 and belong to Level 0 within the hierarchy 100. According to an embodiment of the present invention, such wireless tags may include, for example, a send/receive antenna, a printed circuit board (PCB), a small non-volatile memory for storage of the unique number associated with the wireless tag and optionally a serial number of the wireless tag. The Level 0 wireless tags may be passive, in that they may utilize the energy received on the send/receive antenna to send out the unique number associated with the wireless tag when polled by hierarchically-higher levels (e.g., Level 1). Although only three Level 0 wireless tags 102 are shown in FIG. 1, it is to be understood that a great many such wireless tags may be used, as they may be fabricated inexpensively relative to the value of the objects they protect. In contrast, a great many wireless tags 102 are shown in the pyramidal structure of FIG. 3. This pyramidal structure in FIG. 3 is intended to evoke the hierarchical structure inherent in embodiments of the present invention. Level 0 wireless tags 102 may be configured to be used once and thereafter discarded. Moreover, Level 0 wireless tags 102 may be configured to be rendered inoperative if removed from the article to which they are affixed, for reasons developed in detail below. In the example developed above, the Level 0 wireless tags 102 may be affixed to each of the stereos or to the packaging thereof.

Level 0 wireless tags communicate with the Level 1 device(s) 104. For example, a single Level 1 RF repeater device may be affixed to the box that contains the individual articles to which the Level 0 wireless tags are affixed. In the example above, a Level 1 RF repeater device 104 would be affixed to or otherwise incorporated within each of the boxes of 100 stereos, each (or selected ones) of the 100 stereos having a wireless tag 102 coupled thereto. Level 1 RF repeater devices 104 may be configured with the capability of polling the Level 0 wireless tags 102, reading the unique number transmitted by the Level 0 wireless tags 102, storing these unique numbers and repeating the stored unique numbers for receipt by hierarchically higher RF repeaters or devices. In addition, a unique number is also associated with each Level 1 repeater device 104, and the Level 1 repeater device 104 may also be configured to send this unique number to devices occupying hierarchically higher positions. Level 1 repeater devices 104 may be configured to receive synchronous and asynchronous RFID signals, store them and repeat them to hierarchically higher repeaters or devices. Level 1 repeaters 104 may also be configured such that when its battery(ies) is/are exhausted, it may respond with RFIDs to received signals as a passive device. The signals repeated by Level 1 repeaters 104 may be encrypted, for security concerns. Level 1 repeaters 104 may be configured with other security features. Level 1 repeaters 104 may be disposable. However, Level 1 repeaters 104 may also be configured so as to enable them to be detached from the box to which they were affixed and reused. Alternatively still, the Level 1 repeater 104 may be permanently affixed to the box. The box may be sold with a deposit intended to cover at least the cost of the repeater 104. Upon return of the box and repeater 104 to the shipping concern, the deposit may be returned. As is further detailed relative to FIG. 2, Level 1 repeaters 104 may report box seal as a Level 0 object—an object to which a wireless tag 102 is coupled. That is, Level 1 repeaters 104 and the box to which they are affixed may be configured such that the Level 1 repeaters 104 report whether the box remains sealed or whether the seal has been breached.

The wireless tags and/or higher-level device may be powered by batteries. A battery powered wireless tag or higher level device, according to an embodiment of the present invention, may be configured to store sufficient energy to announce its low battery status as a last resort. Alternatively, a static memory state may be altered on the tag or higher level device, and the tag or higher-level device may become passive (i.e., able to respond only when polled) absent power, and may be configured to reflect its status as "Present but Battery Impaired" when polled. The batteries may be recharged through induction to maintain active or semi active tags. Induction charging of the batteries may be carried out during transit and by moving apparatus in warehouses to maintain freshness. Alternatively, tags may also be configured to be powered by the objects to which they are affixed, integrated with these objects so that the objects or items cannot function if the tag is removed, or otherwise configured to meet specific requirements of a logistic, commercial, or technical application.

Level 1 repeaters 104 may communicate with or without encryption to Level 2 high-level devices 106 by means of RFID or via a wireless network, such as a WiFi network (e.g., 802.11X), for example. Level 2 high-level devices 106 may be affixed to the next larger container, such as a container that holds a number of boxes to which the Level 1 repeaters 104 are affixed. For example, in the case of oceanic freight, a Level 2 high-level device 106 may be affixed to a shipping container containing a number of such boxes. The Level 2 high-level device 106 may be permanently affixed to the container or may be removably affixed to the container such that any unauthorized attempt at removal destroys the seal on the container. Alternatively, an encapsulating seal may entirely surround the contents of a container, the puncture or penetration of which would breach the seal. Level 2 high-level devices 106 may have the functionality of a personal computer, or may otherwise have some processing, storage and communication capabilities. The Level 2 high-level devices 106 may include a send/receive antenna, a PCB, and may be in an "Always On" configuration, repeatedly polling for signals from Level 1 repeaters 104. The Level 2 high-level devices 106 may also be configured to poll for signals from Level 1 signals when the Level 1 repeaters' batteries are exhausted and the Level 1 repeater devices 104 are operating in a passive manner. Level 2 high-level devices 106 are preferably configured with sufficient storage to store and pass on all RFIDs received from hierarchically lower devices and tags to Level 3 high-level devices 108 that occupy higher positions within the hierarchy. The Level 2 high-level devices 106 may have wireless communication functionality, to enable connection of the Level 2 signals to a computer network. For example, Level 2 high-level devices 106 may communicate via a secure (i.e., encrypted) WiFi or other short-range wireless network. As with Level 1 repeaters. 104, Level 2 high-level devices 106 may report the container seal as a Level 1 object.

Level 2 high-level devices 106 may communicate with the hierarchically higher Level 3 high-level devices 108 wirelessly (through a WiFi network for example) and/or through another computer network such as the Internet. Depending upon the implementation, the hierarchy may have only one level of high-level devices or may have two or more levels of high-level devices. Level 3 high-level devices 108 may be or include a PC or a larger computer. The Level 3 high-level device 108 may function as a Logistics Monitoring Station. Always on, the Level 3 high-level device 108 is configured to receive signals from hierarchically lower high-level devices 106, repeaters 104 and wireless tags 102 and to send them to a hierarchically higher Level 4 top-level device 110, together with its own ID. The Level 3 high-level device or devices 108 may be coupled to a logistics database applicable to part or all of a logistics domain. For example, a Level 3 high-level device 108 may be disposed on a container ship (see FIG. 2) and may communicate wirelessly with some or all of the containers loaded on the ship that are equipped with Level 2 high-level devices 106. Alternatively, a Level 3 high-level device 108 may be disposed within a shipping yard, rail station, big box retail establishment or airport and may communicate with the universe of containers or other receptacles equipped with Level 2 high level devices 104 to a Level 4 top-level device 110 through a computer network, together with its own identifier. The Level 3 high-level device or devices 108 may be configured to decrypt data relative to presence and status of the wireless tags 102, repeaters 104 and high-level devices 106, 108 within the hierarchy. Such decrypt capabilities may be accessed through appropriate security controls including, for example, authentication and authorization of personnel requesting use of such decrypt capabilities.

A Level 4 top-level device 110 may be provided, as shown in FIGS. 1 and 3. The Level 4 top-level device 110, called a top-level device because it occupies the hierarchically highest position, may serve as a Logistic Universe Station. (Note that Level 5, Level 6, and Level n universes may be effected to meet specific application requirements.) The Level 4 top-level device 110 may be a PC or more powerful computer or have functionality equivalent thereto. The Level 4 top-level device 110 may be geographically remote from the Levels 0-3 wireless tags, repeaters and high-level devices 102, 104, 106, 108 and may be coupled to a Logistics database applicable to all or part of the logistics domain. The Level 4 top-level device 110 may communicate with the Level 3 high-level device or devices 108 through a computer network. The communication between the Level 4 top-level device 110 and the Level 3 high-level device or devices 108 may be achieved through a Virtual Private Network (VPN) over the Internet, for example. The communication channel(s) established between the Level 3 high-level device or devices 108 and the Level 2 high-level devices 106 may be similarly configured. The Level 4 top-level device 110 may be "Always On", and is configured to receive and store the signals from hierarchically lower wireless tags 102, repeaters 104 and high-level devices 106, 108 and may be configured to enable secure access to such data through appropriate security measures. For example, the Level 4 top-level device 110 and associated logistics database may be located and/or accessed from a manufacturer's, seller or buyer's headquarters, to enable real time or near real time tracking of items shipped anywhere in the world, at any time. Any number of Level 3 high-level devices 108 may report to the Level 4 top-level device 110. This makes it possible to track a fleet of freight ships, trains, trucks or airplanes, for example, as well as the contents of all containers they carry, and to do so in real or near real time. Indeed, the information stored in the database 218 is only as old as the last time the Level 1 repeaters 104 polled the wireless tags 102 affixed to the contents of the container or package and propagated the results back up through the hierarchy. Such polling may be initiated by the Level 1 or by any hierarchically higher device. In this manner, a "snapshot" of the current status of all tagged items, boxes or containers may be obtained at will, and as frequently as desired.

Figure 2:
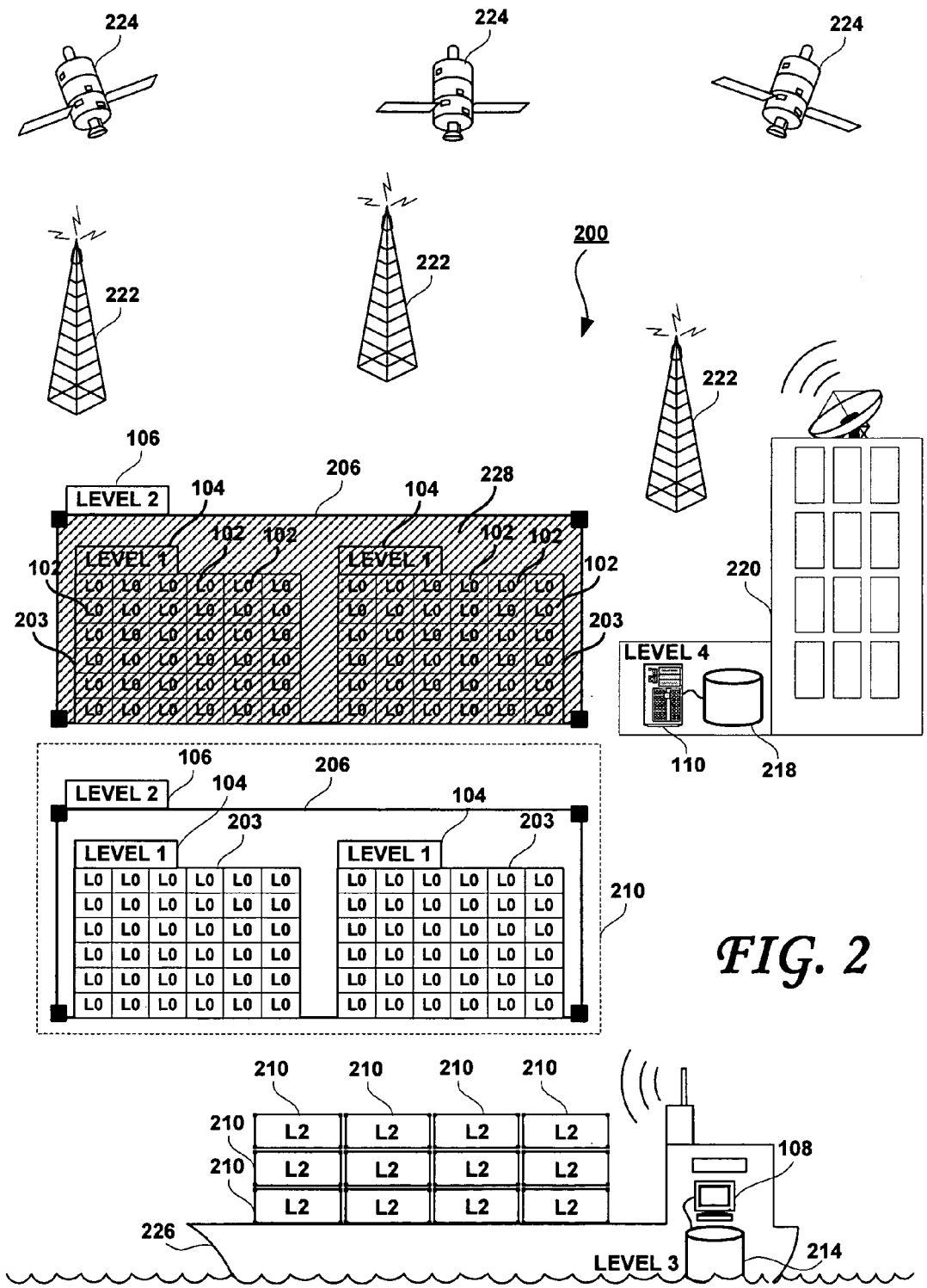
FIG. 2 is a diagram that illustrates an illustrative implementation of an embodiment of the present invention.

FIG. 2 is a diagram that illustrates an illustrative and exemplary implementation 200 of an embodiment of the present invention. As shown therein, reference numerals 102 denote boxes or packaging containing one or more items to be tracked, together with a Level 0 wireless tag affixed thereto. The Level 0 wireless tags 102 may be affixed to the item or article itself or to the box or packaging material that encloses the item or article. For example, each of the Level 0 wireless tags 102 may be attached to a seam of the packaging or box enclosing the item such that breaching the seam (e.g., opening the box) would destroy the Level 0 wireless tag's ability to send an RFID to a Level 1 repeater 104 upon being polled. Alternatively, the box may be enveloped in a "seal" which would report puncture or penetration. In this manner, the box is "sealed" by the wireless tag, with the tag possessing the ability to report on the state (e.g., intact or breached) of such seal. A plurality of boxes equipped with Level 0 wireless tags 102 may be enclosed in a larger box, as shown at 203. In the example illustrated in FIG. 2, thirty-six boxes equipped with Level 0 wireless tags 102 are enclosed in each box 203. A Level 1 repeater 104 is affixed or is an integral part of each such box-repeater 104. The Level 1 repeater 104 is configured to poll each of the Level 0 wireless tags 102 (denoted as "L0" in FIG. 2) and to receive a unique RFID from each of the polled wireless tags 102. The Level 1 repeater 104 is also configured to store these received RFIDs from each of the polled wireless tags 102 and to send them in a secure and wireless manner to a Level 2 high-level device, as shown at 106.

A plurality of boxes, each equipped with a Level 1 repeater 104 may be grouped in a still larger enclosure. In FIG. 2, such a larger enclosure is shown, for exemplary purposes only, as a standard container 206 for oceanic freight. The container 206 may be equipped with a Level 2 high-level device 106 that is configured to communicate with the Level 1 repeaters 104 affixed to the boxes contained therein. In FIG. 2, two such boxes 203 (which may be, for example, pallets) are contained in each container 206. As shown, numeral 210 collectively references a container unit that includes the standard container 206 with affixed Level 2 high-level device 106 and all of its contents; namely, the boxes 203 and affixed Level 1 repeaters 104 and the thirty-six such boxes and Level 0 wireless tags 102 contained within such boxes 203. In the example shown in FIG. 2, a dozen such container units 210 are shown loaded on a freight ship 226. As suggested by FIG. 2, each of the container units 210 is configured to securely communicate, via its Level 2 high-level device 106, with a Level 3 high-level device 108. The Level 2 high-level device 108 may be disposed within the freight ship 226, and may be used to keep track of each of the container units 210 and to report the presence and status of same to a Level 4 top-level device 110, most likely located in a remote location, such as a corporate headquarters or other tracking facility on land. The Level 3 high-level device 108 may be coupled to a logistics database 214, which may also be located on board the freight ship, for example.

The Level 3 high-level device 108 may securely communicate (via the TCP/IP protocol, for example) with a remote Level 4 top-level device 110 via the ship's communication system. For example, such communication may be carried out via one or more repeater towers 222 if the freight ship is sufficiently close to such repeater towers or may communicate via one or more satellite 224 with the Level 4 top-level device 110. The Level 4 top-level device 110 may be coupled to a logistics database 218. It may be seen that the remote Level 4 top-level device 110 enables authorized personnel to poll high-level devices 108, 106, repeaters 104 and wireless tags 102 down through the hierarchy to determine the presence and/or status of the items shipped in real or near real time, irrespective of their location. According to an embodiment of the present invention, at least the Level 2 high-level devices 106 (and optionally Level 3 high-level devices 108) may include a GPS receiver and be may be configured to receive positioning signals (for example, from constellations of Global Positioning Satellites 224 (GPS) or GLONASS systems or LPS, for example) to fix and report its geographical coordinates to pinpoint its geographic location most anywhere on Earth. Various levels of the hierarchy may also be configured to report on the individual and aggregate monetary value of tagged items at each level. The monetary value of the tagged items may be stored and reported locally within the hierarchy or stored in a look up table in one or more databases coupled to the hierarchy. Such individual or aggregate monetary value may then form the basis of queries against the hierarchy.

Additional security measures may be implemented. For example, one or more of the containers and its Level 2 high-level device 108 may be configured such that the act of opening the container unit 210 is detected and reported up the hierarchy by the Level 2 high-level device 108. An authenticated and authorized agent, acting through the database attached to the hierarchy, may be permitted to open a container without causing an alarm. The person who opens a container would either be authorized or not, and the event would be logged in the database in any such case. Alarms would follow access by an unauthorized person. For example, one or more of the containers 206 may be encased in a thin conductive mesh 228 (e.g., a latticework, array or web of thin conducting wires) that would be breached or disturbed if someone attempted to open the container 206. Such a thin conductive mesh 228 may be formed of fine wire, arrayed in a two dimensional mesh, and may conduct a current until disturbed. A wireless tag or higher level device may be coupled to or form an integral part of the mesh 228 and may be configured to report when polled. For example, the wireless tag or higher level device may be configured to report a 0 when the container is unopened or undisturbed and to report a 1 when the container to which it is attached is opened or otherwise disturbed from the container's initial condition when the mesh was affixed thereto. The wireless tag or higher level device may also be configured to respond with the serial number of the tag or higher-level device itself. The wire or other conductor making up the mesh 228 will have characteristics such as capacitance and resistance, which can be used to uniquely identify it and which will change if the wire is seriously disturbed, as it would be if the seal were ruptured. Such a mesh 228, therefore, may be configured to be destroyed upon removal thereof from the container and/or upon opening the container in any manner. The fact of removing, breaching, destroying or stretching the mesh may form the basis for a reportable event, in that the changes in the wire mesh characteristics may be detected by the wireless tag or higher level device coupled to the mesh 228 and reported to hierarchically-higher devices. In this manner, a seal may include a wire mesh or equivalent buried in the physical seal and with an RFID tag or higher-level device attached. The tag or higher-level device may then transmit a signal indicative of the characteristics of the intact wire or the information that the wire is disturbed. Using this embodiment, all physical boxes, luggage, etc. may be sealed/locked and tagged in the manner described immediately above.

It is worthy to note that containers of all kinds may, according to this embodiment, detect not only when items are taken from the container, but may also detect the fact that items may have been added to a container. Indeed, when the wire mesh 228 is disturbed, items may have been added and/or removed from the container to which the wire mesh 228 is coupled, when the encapsulating seal is used. This embodiment, therefore, provides effective smuggler protection, allowing inspectors to take responsibility for the integrity of a container and the container, once sealed, can maintain its integrity until it reaches its destination. Inspectors at the container's origin could seal the container and certify the contents thereof as long as the mesh 228 remains undisturbed. The act of opening the container, the time at which such act occurred, the unique identification or serial number of the container and the geographical coordinates of the container when such act occurred all could be reported to Level 3, Level 4, or Level n top-level devices 108, 110. Such reporting could occur immediately upon breach or after one or more high level devices 108, 106, repeaters 104 and/or wireless tags 102 fail to respond to polling. Maintaining a record of the time and locations of items shipped also uniquely identifies those who had custody (or should have had custody) of the box and the contents thereof at any given time or place. Such capabilities and the information contained in such reports may help to determine liability (of great interest to insurers) in case of loss or damage and/or act as a deterrent to those who would contemplate opening the container and removing objects stored therein without authorization. Indeed, stealing a box equipped with a high-level device 108, 106, a repeater 104 or a wireless tag 102 most often involves moving the box out of the range of the repeaters 104 and/or moving the box to a location that does not appear on the planned itinerary for the box and its contents. For example, if a wireless tag or higher-level device is coupled to a wire mesh 228 encapsulating or covering all or a portion of a container (also referred to as a "sealed tag" hereafter) the sequence of actions recorded against a sealed tag or sealed higher-level device may reveal the specific person or entity last associated with or responsible for a sealed container before the container became unsealed.

Such sealed tags may offer great utility in the context of shipping high-value items. For example, fine art paintings may be provided with a sealed tag during shipment. That is, the painting or its frame may be encapsulated in a wire mesh 228 to which a tag or higher-level device is coupled. Moreover, the mesh 228 may be attached to both the frame and the canvas of the painting. In this manner, removing the painting from the frame is an event that would be reported through the hierarchy and appropriately logged. The container in which the painting is shipped may also be provided with a (hierarchically-higher) sealed tag or sealed higher-level device. Such sealed tags and sealed higher-level devices are well adapted for inter-museum shipments of fine art, for example. By virtue of the tracking and security features of embodiments of the present invention, the transfer of custody, responsibility, ownership, authority, regulatory status, and other physical and logical characteristics of sealed items, boxes or documents is an anticipated part of this invention. In the painting example developed above, a frame may enclose an original painting, and a seal including a conductive mesh 228 on that frame may attest to the authenticity of the painting. The seal, frame, and painting may be tracked according to embodiments of this invention and the provenance of the painting preserved for either return or further transfer.

High-devices 108, 106 repeaters 104 and wireless tags 102 may be configured to transmit signals up to a predetermined range. The range need not be the same for Level 2 high-level devices 106 as it is for Level 1 repeaters 104 as it is for Level 0 wireless tags 102. For example, Level 0 wireless tags 102 may have the shortest range, Level 1 repeaters 104 may have a somewhat longer range and Level 2 high-level devices 106 may have a range that is longer still, so as to effectively communicate with a Level 3 high-level device 108 that may not be in the immediate vicinity thereof. It is to be noted that an unauthorized taking of a box or other container equipped with a wireless tag 102, repeater 104 or high-level device 106, 108 may be construed as theft, unauthorized opening of the box or container or an indication that the box or container is being misrouted, whether intentionally or unintentionally. Embodiments of the present invention enable a comprehensive historical (updated to real time or near real time) record of the status and location of items to be maintained in the databases 214, 218. The scope of such historical record may potentially span from manufacture of the item to sale and/or use or consumption by a buyer or end user.

Embodiments of the present invention may be useful in the context of items that must be returned to the seller or manufacturer. Indeed, it may be specified that any return of an item or article tagged with a Level 0 wireless tag 102 must be in the original box or container equipped with a Level 1 repeater 104. In his manner, the Level 1 repeater 104 will be able to record the RFID of the tagged article as it is placed into the box or container equipped with the Level 1 repeater 104 for return shipment. This RFID received by the Level 1 repeater 104 may then be propagated up through the hierarchy and ultimately communicated to the seller or agent for the seller.

Another embodiment of the present invention calls for the wireless tag or higher-level device to be attached to both the item shipped and the container in which the item is shipped. In this configuration, the seal between the item and the container thereof is broken if the item is removed from the container, and the wireless tag or higher-level device is configured to report such a broken seal. In this embodiment, therefore, an unbroken seal indicates both the presence of the item in the container and that the item was never removed from the container during its initial shipment or during the return thereof. This embodiment effectively prevents fraud through removal of the item from the container and shipping the empty container and tag back to the supplier or manufacturer.

Embodiments of the present invention also find utility in determining the veracity of recipients who claim that they were shipped an empty box, instead of a box with the purchased item or items therein. Another example of this present claim is the case where there is a claimed mismatch between the container, label, contents, and/or bill of lading. Indeed, if the box were for some reason empty when shipped, that fact would be so reported by the Level 1 repeater 104, as the Level 1 repeater 104 would not receive an RFID response from the Level 0 wireless tag(s) 102 attached to the items presumably within the box.

According to further embodiments, the Level 1 repeater 104 and/or the Level 2 or 3 high-level devices 106, 108 may be configured to have the ability to detect and track signals that result from opening or breaching a box or container. This is believed to be significant, as boxes or containers equipped with repeaters 104 or high-level devices 106, 108 act as deterrent to those who might want to add harmful or illegitimate contents to a sealed box or container. Indeed, the reading (e.g., polling) of signals from the Level 1 repeaters 104 at intervals will reveal any tampering of boxes or containers containing Level 0 wireless tags 102. Removal of any Level 0 wireless tag 102 or removal of any Level 1 104 repeater by bad actors will alert shippers or the seller or the seller's agent to violations that have taken place since the last check. In this manner, inspection for customs, for example, could be carried out at the point of origin rather than at the port of entry. For example, the dangerous practice of secreting illegal aliens in previously sealed standard freight containers becomes difficult or impossible after an embodiment of the present invention has been installed thereon and the contents of the container inspected at the point of origin. In this manner, no competent authority could escape responsibility for the contents sealed within a container equipped with a repeater 104 or high-level device 106, 108. Another example might include the illegitimate use of such containers for smuggling terrorist or other illegal materials; such containers, even if empty, may be sealed and a breach detected by means of the procedures cited above. Thus, the illegitimate use of deadheaded containers may be detected, and by implication prevented, by applications embodying or including embodiments of the present invention.

Other embodiments of the present invention extend the functionality described above. For example, to open a sealed container, the repeaters 104 or high-level devices 106, 108 may be configured to accept a digital certificate issued by a trusted certificate issuing authority (CA). Such a digital certificate (which may be valid for only a limited period of time) may specify both the identity of the certificate holder, as well as his or her authorization to open and/or inspect the contents of the previously sealed container. Information obtained from such a presented digital certificate (including the time and place when the certificate was presented) may then also be propagated up the hierarchy, thereby providing a positive identification and authority of the certificate holder that breached the container seal. In this manner, should an item or items ultimately turn up missing, it is a known fact that the certificate holder accessed the sealed container. The repeater 104 or high-level devices 106, 108 may also be configured to require input of a Personal Identification Number (PIN), in addition to or in place of a digital certificate. Alternative and/or additional security measures will occur to those of skill in this art.

The Level 3 and Level 4 top-level devices 106, 108 may be configured so as to enable detailed reporting of the state of shipped or stored items. Changes in this state, such as missing items or containers, may be treated as an exception and immediately reported. Such immediate reports not only speed the allocation of responsibility in case of damage or loss, but also help the buyer. For example, in the unfortunate event that a container falls overboard from a ship or a truck has an accident that destroys tagged containers, the buyer may be apprised of the situation in short order. Indeed, the wireless tags that are lost or destroyed will fail to respond to queries from repeaters 104 or the repeaters 104 will fail to respond to queries from hierarchically higher devices 106, 108 and that information or lack of it will propagate up the hierarchy and ultimately communicated to the buyer or intended recipient of the tagged goods. That buyer or intended recipient may then choose to re-order the lost or damaged item long before the original scheduled delivery date for the item that was lost or destroyed. In this manner, the supply chain of the buyer is not disrupted or is disrupted to a much lesser degree than would otherwise be the case without such rapid reporting.

According to another embodiment of the present invention, information as to individual or collective value of tagged items or boxes or containers of items may be stored in any of the several levels of hierarchy and used as a basis for status queries.

According to other embodiments of the present invention, the hierarchy described herein may be used for local positioning with the LPS reading of an item or group of items within a defined area, complex or building. For example, using a plurality of communication antennas such as shown at reference numeral 222 in FIG. 2, the location of a tagged item or container (i.e., an item or container to which a wireless tag 102, repeater 104 or high-level device 106, 108 is affixed) may be derived from the timing of the signals received at each of the spatially separated antennas 222. For example, such antennas 222 may be strategically disposed throughout an airport (and thereby constitute part of a Local Positioning System or LPS), and the presence of a particular piece of missing baggage may be ascertained by polling the devices, repeaters and wireless tags in the hierarchy. If no response is received, the piece of errant baggage may be declared missing. The location in three-dimensional space of a piece of luggage (or its presence at all) may be determined to fix its location within the airport, on a plane, or in a warehouse or other place containing an LPS. The Local Positioning System may be coupled to the GPS system to locate the area serviced by the Local Positioning System. A warehouse or hangar may well shield GPS signals. However, if a Local Positioning System is in place, the three dimensional location of a container (e.g., a container or luggage) equipped with a wireless tag or higher-level device may be ascertained through the Local Positioning System, thereby providing information regarding the presence or absence of the container within the area serviced by the LPS, as well as the status (e.g., intact or compromised) of the container and/or other information (such as a time-stamp, for example).

If such an embodiment of the present invention is installed at the airport of origin, the hierarchy of wireless tags, repeaters and devices may be polled or caused to be polled to determine the presence or absence of the luggage at that location. The hierarchy may extend as widely as desired. If all major airports are so equipped, they may also be polled to determine whether the signal uniquely identifying the missing baggage is within their borders. The tracking system disclosed herein may include any LPS system that is configured to track tagged luggage, passengers, passports, tickets, or any defined combination of these or other tagged objects. Airports, terminals, warehouses, or other physical elements are to be understood herein may be mapped to hierarchies and constructs described elsewhere herein. Other applications include affixing wireless tags to predefined combinations of passenger or luggage (among other possibilities) or other objects as may be associated through a defined relationship to a ticket, passport, or defined right of passage or transit.

A predefined area, logical entity or organization (e.g., a company) may itself be considered to be a virtual or logical container. In contrast to a physical sealed container (such as a shipping container at least partially encapsulated in a mesh 228 that is coupled to a wireless tag or other higher-level device), a virtual or logical container may be a predefined area or organizational structure that is configured to occupy a level within the hierarchy described herein. For example, an entire airport may be viewed and treated as a virtual container in which the ingress and egress and status of boxes and containers and other sealed objects are monitored and logged through the hierarchical polling-response methodology disclosed herein. Insurers, for example, may find derive useful information through logs that show that a predetermined sealed container entered an airport or port in a sealed state and left the airport or port in the same sealed state.

According to another embodiment of the present invention, the repeaters 104 and high-level devices 106, 108 may be configured to poll hierarchically lower Level 0 wireless tags 102, repeaters 104 and/or high-level devices 106 at predetermined intervals; that is, without waiting to be polled by a hierarchically higher device. Moreover, repeaters 104 or high-level devices 106, 108 may be configured to propagate information up through the hierarchy only when there has been a change in the information obtained from hierarchically lower repeaters or devices since the last polling. This would have the effect of reducing traffic within the hierarchy and would reduce the information stored in the databases 214, 218. Other reporting schemes and methods for obtaining information from the hierarchy of wireless tags, repeaters and devices may occur to those of skill in this art, and all such schemes and methods are deemed to fall within the spirit and scope of the embodiments of the present inventions described herein.

Hierarchies may be extended to as many levels as necessary and stretch widely over any geographical area or logical, private, governmental, or organization construct. Indeed, the hierarchy detailed above may extend from packaging and small boxes to containers, trucks, ships, ports, warehouses, bonding, inspection status (which may be seen as a virtual box, container, or defined level or scrutiny), all the way to the top-level of a logistics (or defined universe) chain. The databases 214, 218 may be configured to store all of the information obtained through polling the hierarchy and the database software should be configured to control access to such information, trigger alarms upon the occurrence of predetermined events and contain and report the history of transactions occurring within the logistics chain. Embodiments of the present invention find particular utility in the context of the supply or inventory chain of big box department stores (e.g., Wal-Mart, Target and the like), where the hierarchy discussed herein may be mapped on the entire or a portion of the supply chain or corporate organizational structure, from vendors to individual stores and, ultimately, to the customers themselves. The present invention may also find utility in the context of military supply and logistics, where items may be tracked at any level of granularity that may be desired. Other applications and implementations may occur to those of skill in this art.

Embodiments of the present invention provide a technical means of "seeing" into a package to determine its contents and determining the presence, absence and location of a shipped or stored item at any time. The proximity (or lack thereof) of a box and its intended contents (e.g., articles of sale or exchange) may also be determined using embodiments of the present invention.

Another embodiment of this invention may be as tags embedded in and used to track financial instruments such as bearer bonds, currency, securities, or others as a general device to prevent fraud, counterfeiting, or other illegal commerce. For example, tagged currency may be tracked as it passes through a hierarchy of wallets, stores, banks, and the Federal Reserve, each of which may be considered a logical and physical container for the bill. Note also that a protected instrument such as a letter of credit may be controlled and its permitted uses monitored by applications using this invention. Embedding such tags as are described herein in passports, luggage, or identification papers could enable rapid and secure protection of travel transit vehicles. Further protection against violation of inspected luggage, passports, or papers could enable transfer of such luggage through checkpoints, across borders, and between transit vehicles such as airplanes. Such position checking may be employed in specific applications to determine the locus of a protected item such as a passport, bearer bond, item of currency used in recorded payment, or other such protected item.

The inspection, validation, integrity, and security of container hierarchies in general and of contents in particular require measures such as described herein. The movement of a tracked item, regardless of its place in one hierarchical universe, may be effected between universes subject to the hierarchical schema described herein. That is, transfer of custody, responsibility, ownership, authority, regulatory status, and other physical and logical characteristics is an anticipated part of the inventions described herein. For example, a frame may enclose an original painting, and a seal on that frame may attest to the authenticity of the painting. The seal, frame, and painting may be tracked according to the inventions described herein and the provenance of the painting preserved for either return or further transfer.

Figure 4:
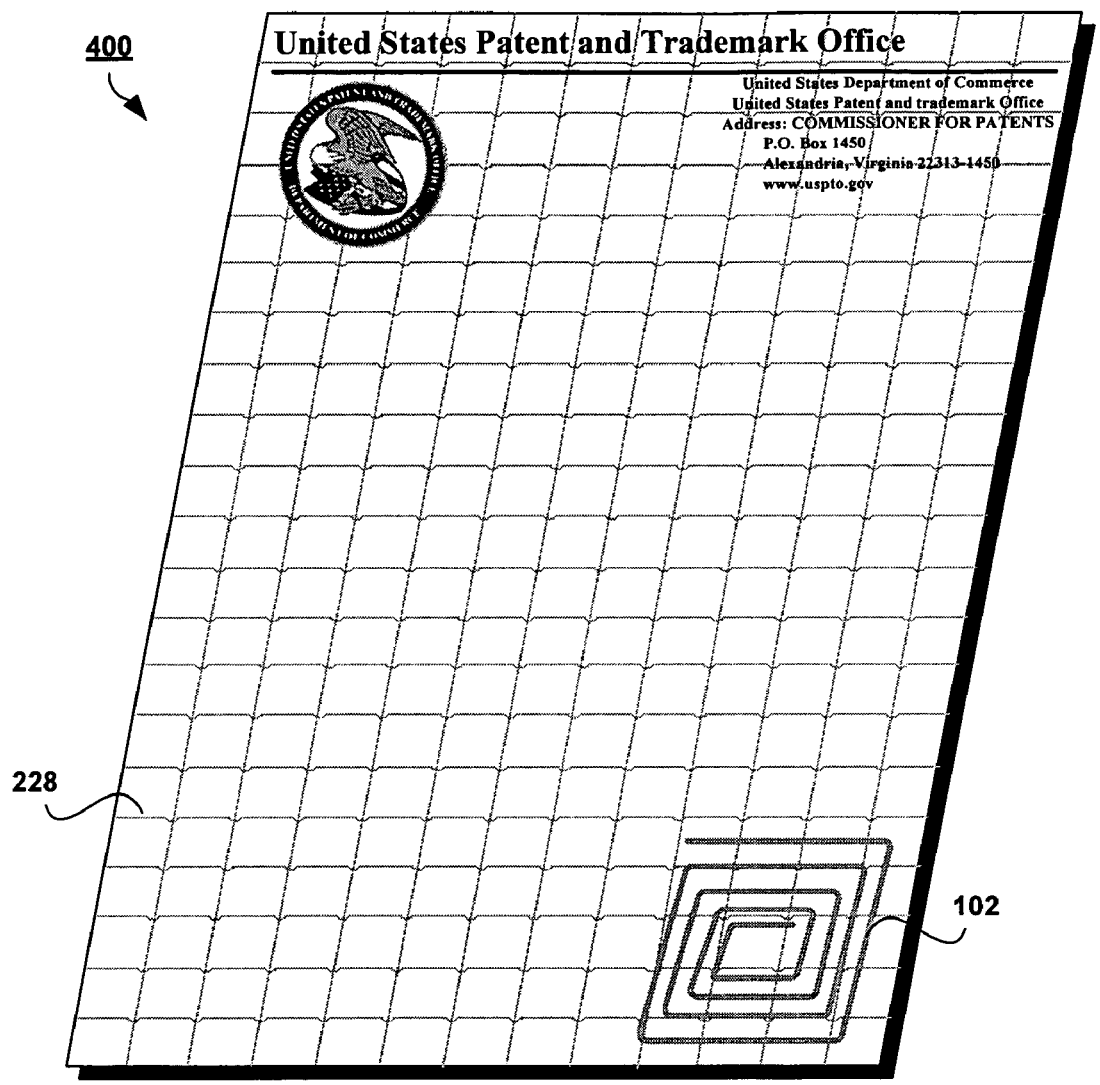
FIG. 4 is a representation of an exemplary sealed document, according to an embodiment of the present invention.

Paintings and fine art are only one example of alternative uses for a sealed container, according to the present inventions. The same concept of a sealed container may be applied to the security of official and important documents such as, for example, passports, identity papers, driver's licenses legal documents and banknotes. An example of such a sealed document is shown in FIG. 4. Indeed, a wire mesh such as shown at 228 that is coupled to a wireless tag 102 (a passive level 0 tag, for example) may be embedded within a document 400. Each document so equipped may be associated with a certificate issued from a trusted Certificate Authority (CA), which would define the access rights granted to selected authenticated individuals with respect to the data generated from polling such documents and any other data associated with such documents. For example, a physician's ID card equipped with the mesh 228 and wireless tag may be associated with a certificate, authorizing selected individuals with the proper authority to access and/or change the physician's professional data such as drug furnishing number, admission privileges, etc. Such sealed documents (i.e., documents in which a wire mesh 228 and wireless tag are embedded) may be assigned to any level within a hierarchy, such as the hierarchy shown at FIGS. 2 and 3. Embedding a wire mesh as shown at 228 within a document offers a higher level of security, as compared to simply gluing an RFID to a document. Indeed, the physical and/or electrical characteristics of the mesh 228 embedded within the document may be such that tampering with the document changes these characteristics, resulting in the "seal" between the wireless tag and the mesh 228 being broken, which is a reportable event when the document is next polled by a hierarchically-higher level repeater or device. In this manner, a sealed document such as shown at 400 may be considered as a sealed box or container within a hierarchy of such documents or within a mixed hierarchy of sealed physical containers and sealed documents. For example, the Bill of Lading accompanying a sealed container may itself be configured as a sealed container by embedding a mesh 228 and a wireless tag therein.

Figure 5:
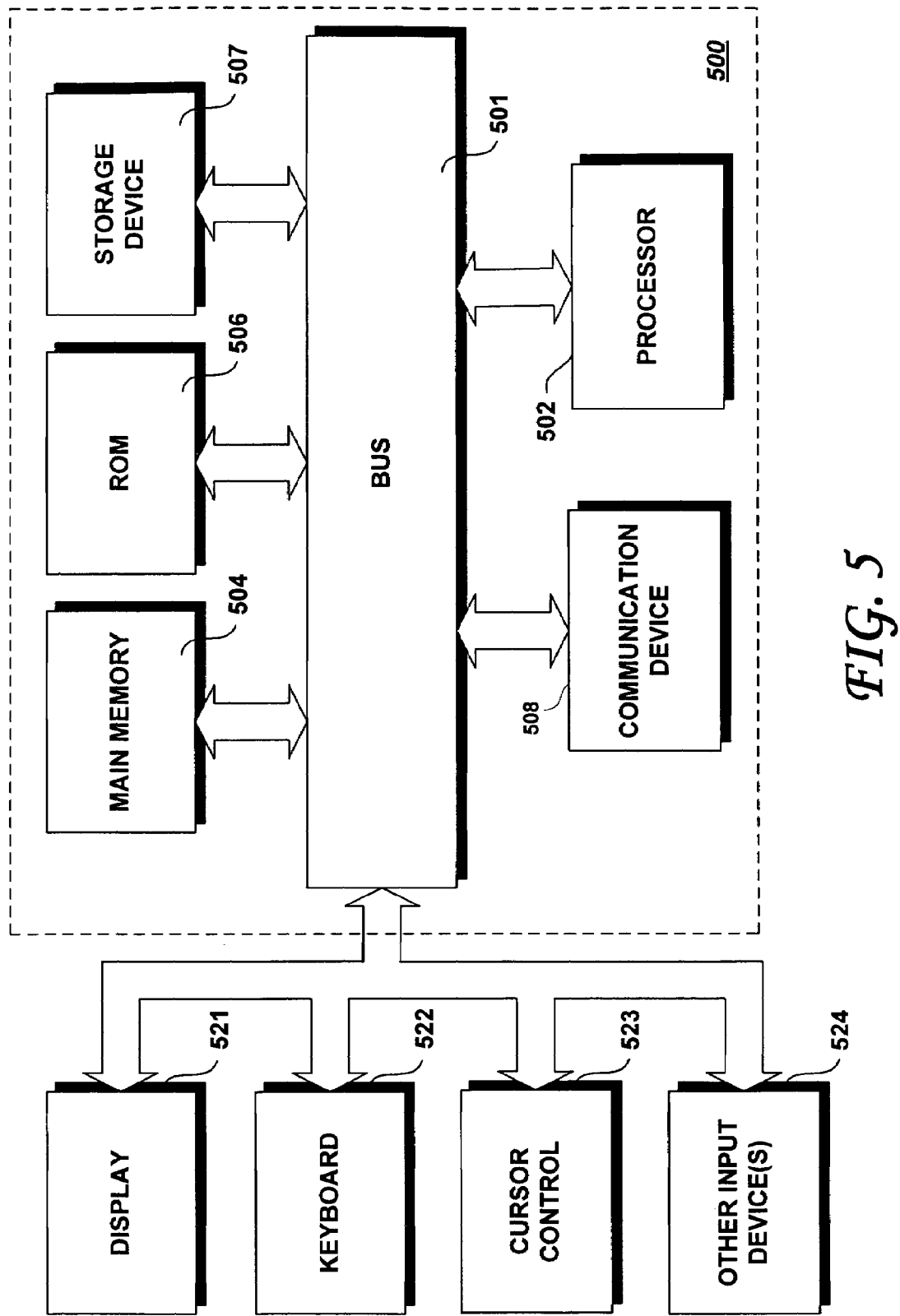
FIG. 5 is a block diagram of a computer with which aspects of embodiments of the present invention may be practiced.

FIG. 5 illustrates a block diagram of a computing device 500 with which an embodiment of the present invention may be implemented. Computing device 500 includes a bus 501 or other communication mechanism for communicating information, and a processor 502 coupled with bus 501 for processing information. Computing device 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computing device 500 may also include a read only memory (ROM) and/or other static storage device 506 coupled to bus 501 for storing static information and instructions for processor 502. A data storage device 507, such as a magnetic disk or optical disk, may be coupled to bus 501 for storing information and instructions. A communication device 508, such as a modem or network (such as Ethernet or a 802.11X device, for example) card is also coupled to the bus 501 to provide access to a computer network (a WiFi network and/or the Internet, for example).

The computing device 500 may also be coupled via bus 501 to a display device 521 for displaying information to a computer user. An alphanumeric input device 522, including alphanumeric and other keys, is typically coupled to bus 501 for communicating information and command selections to processor 502. Another type of user input device may be user's own voice or cursor control 523, such as a mouse, a trackball, or cursor direction keys for communicating direction information and command selections to processor 502 and for controlling cursor movement on display 521.

The present invention is related to the use of computing device 500 to enable the tracking of a plurality of items, as described and shown herein. According to one embodiment, the method for tracking is carried out by one or more computing devices 500 and other devices as described herein in response to processor(s) 502 executing sequences of instructions contained in memory 504. Such instructions may be read into memory 504 from another computer-readable medium, such as data storage device 407 and/or from a remotely located server. Execution of the sequences of instructions contained in memory 404 causes processor(s) 402 to implement the tracking functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A device for tracking an item or a box, the device comprising:
   a conductive mesh configured to at least partially cover the item or the box, and
   a wireless tag coupled to the conductive mesh, the wireless tag being configured to report a breaching of the conductive mesh or an opening of the box by issuing a first predetermined RF signal, the conductive mesh and the wireless tag being configured such that removal of the wireless tag from the conductive mesh disables the wireless tag.

2. The tracking device of claim 1, wherein the wireless tag includes an RFID device.

3. The tracking device of claim 1, wherein the wireless tag is configured to issue a second predetermined RF signal, the second predetermined signal indicating that the conductive mesh and wireless tag are intact.

4. The tracking device of claim 3, wherein the wireless tag is passive and configured to issue the first or second predetermined RF signals only when polled.

5. The tracking device of claim 1, wherein the wireless tag is configured to draw its power from a battery.

6. The tracking device of claim 1, wherein the item is a box and wherein the conductive mesh is configured to at least partially encapsulate the box.

7. The tracking device of claim 1, wherein the item is a document.

8. The tracking device of claim 7, wherein the document is currency.

9. The tracking device of claim 7, wherein the conductive mesh is embedded within the document.

10. The tracking device of claim 1, wherein the wireless tag includes a GPS device and is configured to include GPS-derived geographical information in the first predetermined RF signal.

11. The tracking device of claim 3, wherein the first and second predetermined RF signals include a time stamp.

12. The tracking device of claim 1, wherein the wireless tag is configured to be powered from a power source within the item.

13. The tracking device of claim 1, wherein the conductive mesh is a single conductive strand and wherein the wireless tag is configured to report on an electrical property of the single conductive strand.

14. The tucking device of claim 1, wherein a serial number is associated with the wireless tag and wherein the first predetermined RF signal is decodable to retrieve the serial number therefrom.

15. A method of tracking an item, the method comprising the steps of:
providing a conductive mesh;
providing a wireless tag and coupling the wireless tag to the conductive mesh such that removal of the wireless tag from the conductive mesh disables the wireless tag, the wireless tag being configured to wirelessly report a state of the conductive mesh by selectively issuing a first or a second predetermined RF signal;
covering at least a portion of the item with the conductive mesh; and
periodically receiving the first or second predetermined RF signal from the wireless tag coupled to the conductive mesh.

16. The method of claim 15, wherein the providing step is carried out with the wireless tag including an RFID device.

17. The method of claim 15, wherein the providing step is carried out with the wireless tag being configured to issue the first predetermined RF signal when the conductive mesh and the wireless tag are intact and to issue the second predetermined RF signal when the conductive mesh and/or the wireless tag are not intact.

18. The method of claim 15, further including a step of polling the wireless tag and wherein the receiving step is carried out responsive to the polling step.

19. The method of claim 15, wherein the providing step is carried out with the wireless tag being passive and configured to issue the first or second predetermined RF signals only when polled.

20. The method of claim 15, wherein the providing step is carried out with the wireless tag being configured to draw its power from a battery.

21. The method of claim 15, wherein the item includes a box and wherein the covering step includes a step of at least partially encapsulating the box.

22. The method of claim of claim 15, wherein the covering step is carried out with the item including a document.

23. The method of claim 22, wherein the covering step is carried out with the document being currency.

24. The method of claim 22, further including a step of embedding the conductive mesh within the document.

25. The method of claim 15, wherein the providing step is carried out with the wireless tag including a GPS device and the first and second predetermined RF signals including GPS-derived geographical information.

26. The method of claim 15, wherein the providing step is carried out with the first and second predetermined RF signals including a time stamp.

27. The method of claim 15, wherein the providing step is carried out with the wireless tag being configured to be powered from a power source within the item.

28. The method of claim 15, wherein the providing step is carried out with the conductive mesh being a single conductive strand and wherein the wireless tag is configured to report on air electrical property of the single conductive strand.

29. The method of claim 15, wherein the providing step is carried out with a serial number being associated with the wireless tag and wherein the first predetermined RF signal is decodable to retrieve the serial number therefrom.

30. A method of remotely determining if an item has been added to or removed from a container, the method comprising the steps of:
providing a conductive mesh to which is coupled a wireless tag, the wireless tag and the conductive mesh being configured such that removal of the wireless tag from the conductive mesh disables the wireless tag, the wireless tag being configured to wirelessly report a state of the conductive mesh by selectively issuing a first or a second predetermined RF signal;
sealing the container with the conductive mesh; and
periodically receiving the first or second predetermined RF signal from the wireless tag coupled to the conductive mesh, wherein receipt of the first predetermined RF signal indicating that no item has been added to or removed from the container and wherein receipt of the second predetermined RF signal indicating that an item may have been added to and/or removed from the container and wherein non-receipt of either the first or the second predetermined RF signals indicating that the wireless tag may have been disabled.

31. The method of claim 30, wherein the providing step is carried out with the wireless tag including a GPS device and the first and second predetermined RF signals including GPS-derived geographical information.

32. The method of claim 30, further comprising steps of
comparing the GPS-derived geographical information from consecutively received first and/or second predetermined RF signals with an expected itinerary of the container during shipment, and
determining whether and where the container deviated from its expected itinerary.

* * * * *

UNITED STATES PATENT AND TRADEMARK OFFICE
CERTIFICATE OF CORRECTION

PATENT NO.       : 7,646,292 B2
APPLICATION NO. : 11/442033
DATED            : January 12, 2010
INVENTOR(S)      : Richard C. Johnson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,646,292 B2 |
| APPLICATION NO. | : 11/442033 |
| DATED | : January 12, 2010 |
| INVENTOR(S) | : Richard C. Johnson |

It is certified that error appears in the above-identified patent and that said Letters Patent is hereby corrected as shown below:

On sheet 1 of 5, in Figure 1, Ref. Numeral 106, line 2, delete "or or" and insert -- or --, therefore.

In column 1, line 6 delete "Jun. 11, 2004," and insert -- Jun. 14, 2004, --, therefore.

In column 17, line 34, in claim 14, delete "tucking" and insert -- tracking --, therefore.

In column 18, line 7, in claim 22, delete "of claim of claim" and insert -- of claim --, therefore.

In column 18, line 27, in claim 28, delete "air" and insert -- an --, therefore.

Signed and Sealed this
Thirty-first Day of May, 2011

David J. Kappos
*Director of the United States Patent and Trademark Office*